United States Patent [19]

Combette

[11] Patent Number: 5,073,734

[45] Date of Patent: Dec. 17, 1991

[54] COOLING DEVICE FOR A LINEAR MOTOR INDUCTOR

[75] Inventor: Marc Combette, La Fouillouse, France

[73] Assignee: Constructions Electriques du Centre CELDUC Societe Anonyme, Sorbiers, France

[21] Appl. No.: 604,229

[22] Filed: Oct. 29, 1990

[30] Foreign Application Priority Data

Oct. 30, 1989 [FR] France .................. 89 14620

[51] Int. Cl.$^5$ .......................................... H02K 41/00
[52] U.S. Cl. ..................................... 310/65; 310/13; 310/89; 310/91
[58] Field of Search ............... 310/65, 58, 59, 64, 310/67 R, 85, 89, 91, 12, 13, 17, 208, 43, 54; 318/135

[56] References Cited

U.S. PATENT DOCUMENTS

| | | | |
|---|---|---|---|
| 4,057,045 | 11/1977 | Stellwagen | 310/70 R |
| 4,071,791 | 1/1978 | Armor et al. | 310/65 |
| 4,074,156 | 2/1978 | Widstrand et al. | 310/65 |
| 4,115,712 | 9/1978 | Guimbal | 310/12 |
| 4,172,229 | 10/1979 | Guimbal | 310/13 |
| 4,388,543 | 6/1983 | Guimbal | 310/13 |

FOREIGN PATENT DOCUMENTS

| | | | |
|---|---|---|---|
| 2142871 | 2/1973 | France | 310/54 |
| 2330189 | 5/1977 | France | 310/54 |
| 2382792 | 9/1978 | France | 310/65 |
| 2497420 | 7/1982 | France | 310/54 |

Primary Examiner—Steven L. Stephan
Assistant Examiner—Matthew Nguyen

[57] ABSTRACT

In this device, each one of the spacers 9a-9b of coil disks is made of molded synthetic material and forms a closed C-shaped channel communicating through mouths 33-34 and possesses, between these mouths, a groove 37 for the positioning of the base of a longitudinal stay bar of synthetic material 70, whereas the web 6a of the screen support 6 is covered by an insulating cover of synthetic material 16, and each one of the stay bars 70, constituting a separating partition within an intermediate chamber formed between the insulating cover 16 and the coil 5, is equipped, at each one of its ends, with positioning means 73 which are capable of cooperating with complementary means 62 formed in shields 15-15a of synthetic material longitudinally delimiting each coil 5.

10 Claims, 5 Drawing Sheets

FIG.1

FIG_2

FIG_3

FIG. 6

COOLING DEVICE FOR A LINEAR MOTOR INDUCTOR

BACKGROUND OF THE INVENTION

The invention relates to linear motors, the inductor of which comprises a prismatic axial core surrounded by coils which, being formed of coil disks separated by magnetic islets, are juxtaposed by one of their faces to the web of a U-shaped support, made of material which is a good conductor of electricity, constituting a screen against magnetic leakages, whereas the armature has a U-shaped transverse cross-section covering the inductor.

DESCRIPTION OF THE PRIOR ART

Such a motor is described in French Patents 2,142,871, 2,330,189 and 2,382,792.

The latter document also describes a particular arrangement of the components of the motor and means providing its cooling for the purpose of reducing its dimensions and its cost and of increasing its output. According to this arrangement, each coil disk, framed by two magnetic islets, is spaced from its neighbor by a spacer comprising an annular cooling channel. This channel communicates with slits of the screen support, which slits themselves open into chambers, central and lateral respectively, delimited in this support by separating partitions. At least one of these chambers is connected to means passing a cooling fluid to it in a forced manner. Moreover, the screen support is associated with cooling profile sections over which the cooling fluid passes.

With this arrangement, the cooling fluid, which is in general constituted by air, penetrates into one of the chambers of the screen support, circulates within the spacers to cool the coil disks, and then returns into the other chambers of the screen support before being evacuated, together with the complementary cooling flow, from the profile sections of the support.

Although this circuit is satisfactory, it utilizes means for separating the chambers, for distribution and for channeling of the flows which lack compatibility with a mass production and substantially affect the final cost of the motor, both as a result of their design and as a result of their assembly condition.

SUMMARY OF THE INVENTION

The object of the present invention is to provide a cooling device which, while being less costly and easy to assemble, both for a unit construction and for a mass construction, achieves a better cooling and improves the output.

In the device, according to the invention, each one of the spacers of coil disks, on the one hand, is made of moulded synthetic material, on the other hand exhibits an interior wall and an exterior wall forming a closed C-shaped channel communicating, by mouths formed in its exterior wall and at the ends of the C, with the openings formed in the support screen, and furthermore possesses, between the two mouths, a groove for the positioning of the base of a longitudinal stay bar of synthetic material, while the web of the screen support is covered, on its side turned towards the axial core, by an insulating cover of synthetic material, which cover is equipped, on one side, with wells engaging into the openings of this web and, on the other side, with two parallel and spaced longitudinal grooves for the positioning of the vertex of a pair of stay bars, and each one of the stay bars, constituting a separating partition within an intermediate chamber formed between the insulating cover and the coil, is equipped, at each one of its ends, with positioning means capable of cooperating with complementary means formed in shields of synthetic material delimiting each coil.

In this device the spacers, the insulating cover, the longitudinal stay bars and the shields are made of moulded synthetic material, and exhibit regular dimensions permitting them to be assembled easily by press fitting and to form partitions and walls channeling the cooling flow, while ensuring the electrical insulation sought without recourse to any other external means. Recourse to a synthetic material having good insulation characteristics permits the improvement of the mechanical temperature stability, the reduction in the thicknesses of the walls of the components and, consequently, the reduction in the dimensions of the inductor, while improving its magnetic characteristics.

Furthermore, recourse to spacers of synthetic material which are associated with metal sheets plastic-coated on their large faces, permits the elimination of all insulating sheets for intercalation between the components of a coil; this facilitates the assembly and especially improves the heat transfer between each coil disk and the juxtaposed channels of the cooling circuit.

Finally, the insulation of the screen support by an independent cover by way of replacement for an insulating layer formed in situ, permits the monitoring of the insulation obtained by the cover before its assembly on the screen and, if this insulation is defective, the replacement of the cover easily without having to discard the screen.

In an embodiment of the invention, the wings of the U-shaped screen support are turned opposite to the axial core and form, together with two partitions which are parallel to them and interposed between the web of the support and an insulating joining piece opposite to this web, a central inlet chamber for the cooling fluid, being a chamber communicating with openings of this joining piece, and two lateral outlet chambers for this fluid, whereas the radiator components associated with the screen support are constituted by fins fixed against the interior face of each wing of the screen support, in the corresponding lateral chamber, and the mouths of each spacer are offset laterally in relation to its median plane, in order to ensure the communication with the central chamber and one of the lateral chambers, irrespective of the mounting direction imparted to the spacer.

With this arrangement, the screen support constitutes a first distribution chamber which, upstream of the coil, channels the cooling fluid inlet and orients it, through its central chamber, in the direction of the spacers, whereas each one of its lateral chambers receives the fluid heated by circulation within the spacers, which fluid is further utilized to cool the screen support by passing over the cooling fins fitted to its lateral walls. The particular arrangement of the mouths of the spacers permits the utilization of one and the same type of spacer, irrespective of its mounting direction, that is to say permits alternating of the spacers in such a manner that the outlet mouth of each one of them communicates with a lateral chamber which is different from that with which the outlet mouths of the juxtaposed spacers communicate. Such an arrangement reduces the production cost of the spacers and simplifies the assembly, since it is sufficient to turn over the spacers on assembly to obtain the inversion of the directions of circulation which is sought.

BRIEF DESCRIPTION OF THE DRAWINGS

Further features and advantages will emerge from the description which follows with reference to the accompanying diagrammatic drawing representing, by way of a non-limiting example, an embodiment of this cooling device.

DESCRIPTION OF THE PREFERRED EMBODIMENT

In a known manner, this linear motor is constituted by an armature and by an inductor, which are respectively designated by A and B. In the embodiment shown, the armature A exhibits, in transverse cross-section, the general shape of a U and is composed of a magnetic part 2 covered internally by a conductive part 3. The inductor B is composed of a prismatic axial core 4 surrounded by coils which are generally designated by 5, one of the faces of which, and in the present case the upper one, is juxtaposed to the web 6a of a U-shaped cross-section support, constituting a magnetic screen and designated for the remainder of the description by the expression "screen support 6". The latter is made of material which is a conductor of heat.

The core 4 of square cross-section is advantageously composed of metal bars 4a of small cross-section which are distributed in rows and columns which are regular and immobilized, after rectilinear or curvilinear positioning in the direction of their length, by a layer of synthetic material 4b molded onto them.

Figure 6:
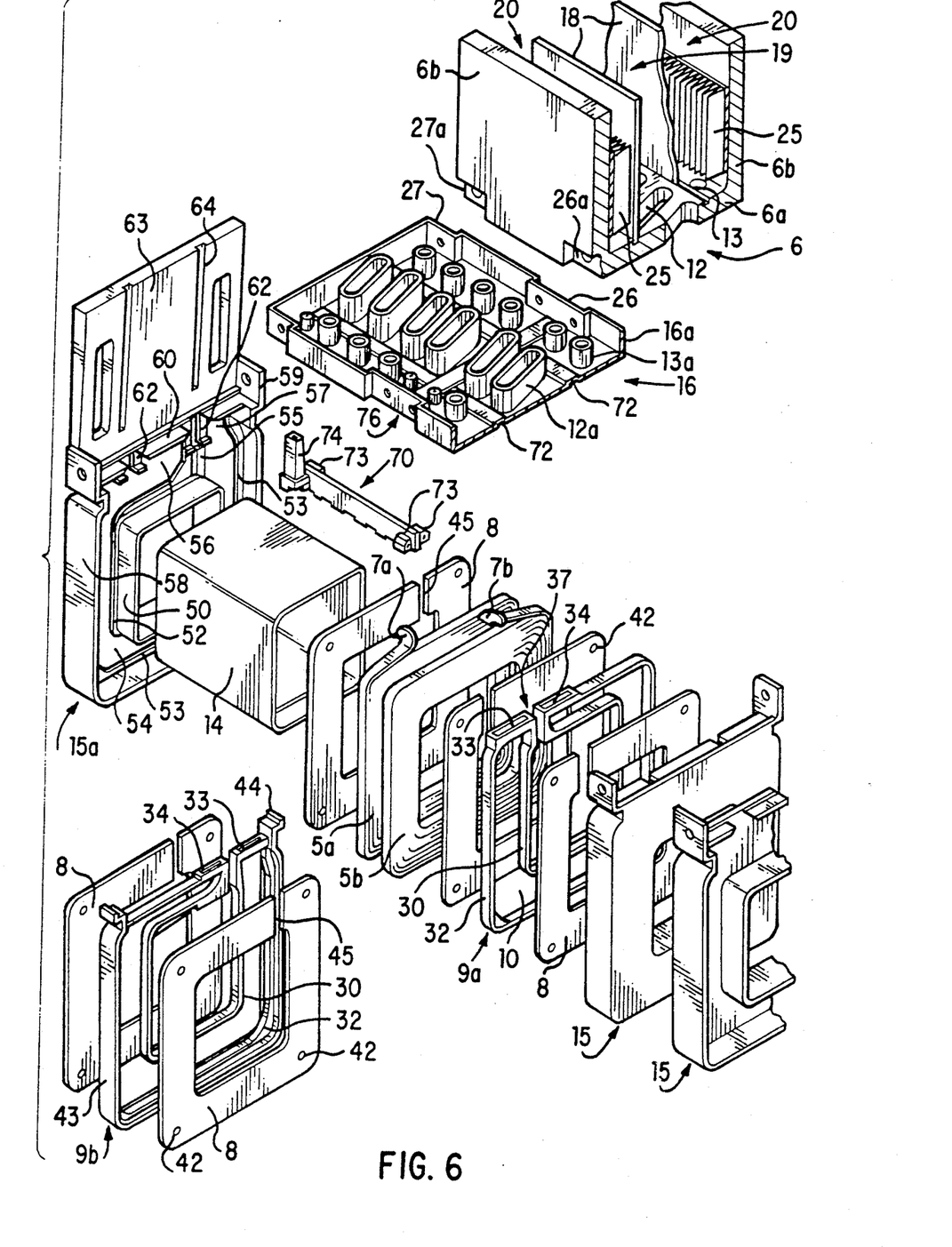
FIG. 6 is a perspective view showing the various components of the inductor.

Each coil 5 is, in a known manner, composed of coil disks 5a and 5b of wrapped wires which are conductors of electricity, which coil disks are connected two by two by a link conductor, not shown, in such a manner as to form double coil disks, of the type represented in FIG. 6. Each one of the coil disks of a double coil disk is integral with a terminal 7a or 7b permitting the provision of its electrical connection. Each coil disk is associated, on each one of its transverse faces, with a laminated metal sheet 8 constituting a magnetic islet and which is, itself, separated from the metal sheet juxtaposed to the neighboring coil disk by a spacer, which is generally designated by 9. The metal sheet 8 is covered, at least on its face turned to the exterior of the spacer, by a layer of insulating synthetic material. As regards the spacer, this delimits an annular cooling channel 10 connected to openings 12 and 13 formed in the web 6a of the screen support 6.

As shown in FIG. 6, each coil 5 constituted by the stack of a plurality of double coil disks, the coil disks of which are spaced by metal sheets 8 with spacers 9, is not mounted directly on the core 4, but on a sleeve 14 of insulating material interposed between the internal bore of the components of the coil and said core. Each coil is delimited longitudinally, and on each side, by an intermediate 15 or end 15a shield. A plurality of coils, and for example three, are thus fixed by the intermediate shields 15 and by the end shields 15a to one and the same support screen section 6, being a section the web of which is covered by one and the same cover 16 of insulating material. The assembly thus obtained forms a half pole of the linear motor. Moreover, each coil of this assembly is connected in series with one of the coils of another half pole to constitute one of the phases of this motor.

Figure 1:
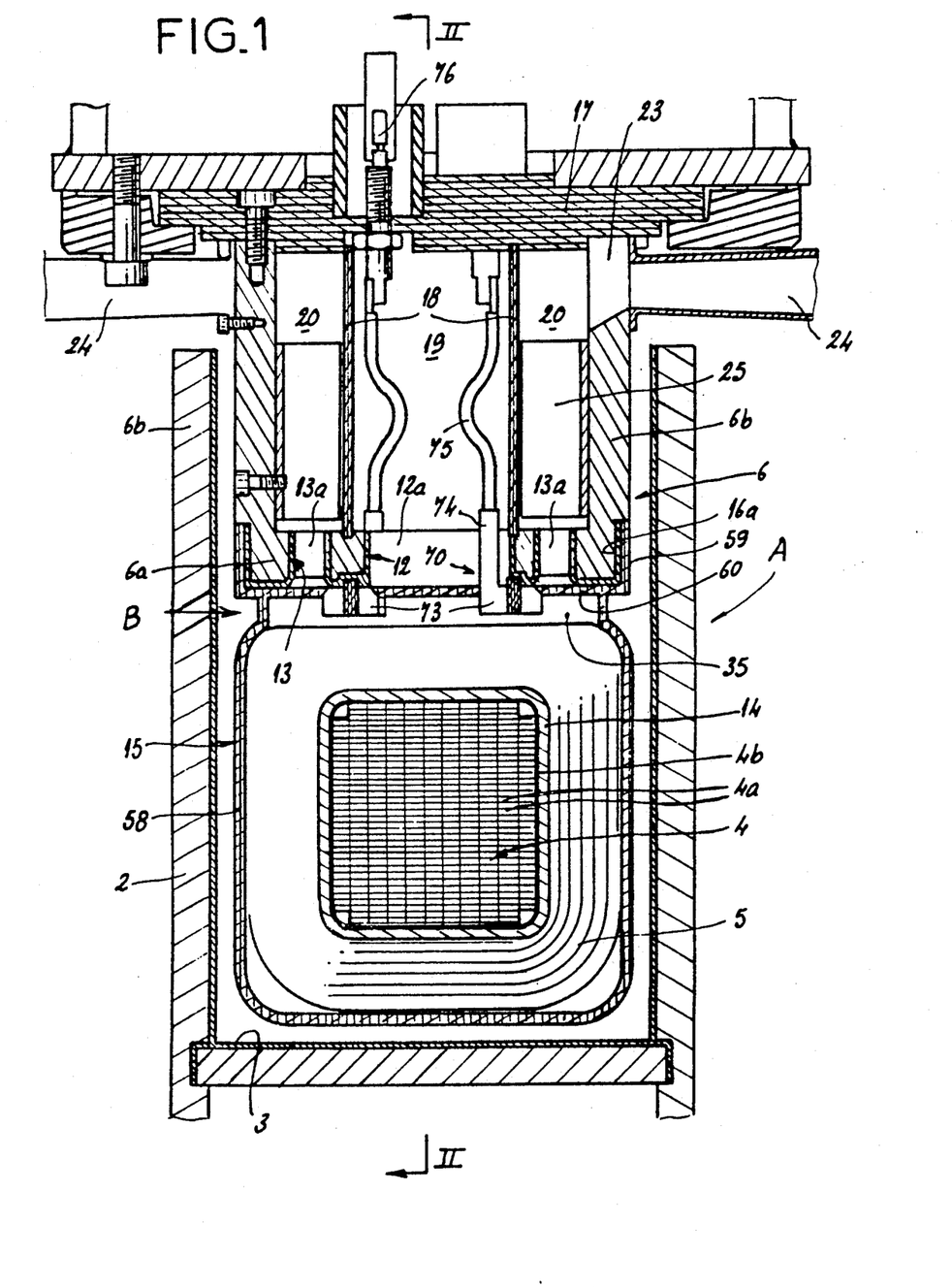
FIG. 1 is a view in transverse cross-section according to I—I of FIG. 4 of the entire motor.
Figure 4:
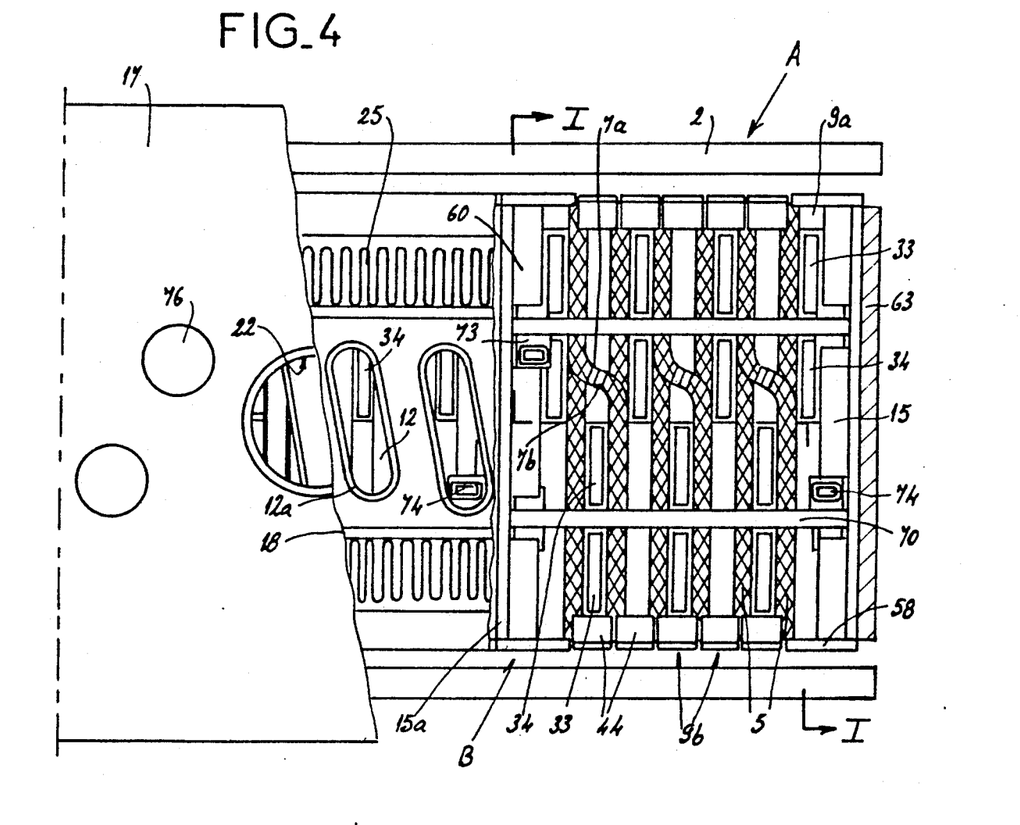
FIG. 4 is a partial view, in top plan and in cross-section according to IV—IV of FIG. 2.
Figure 5:
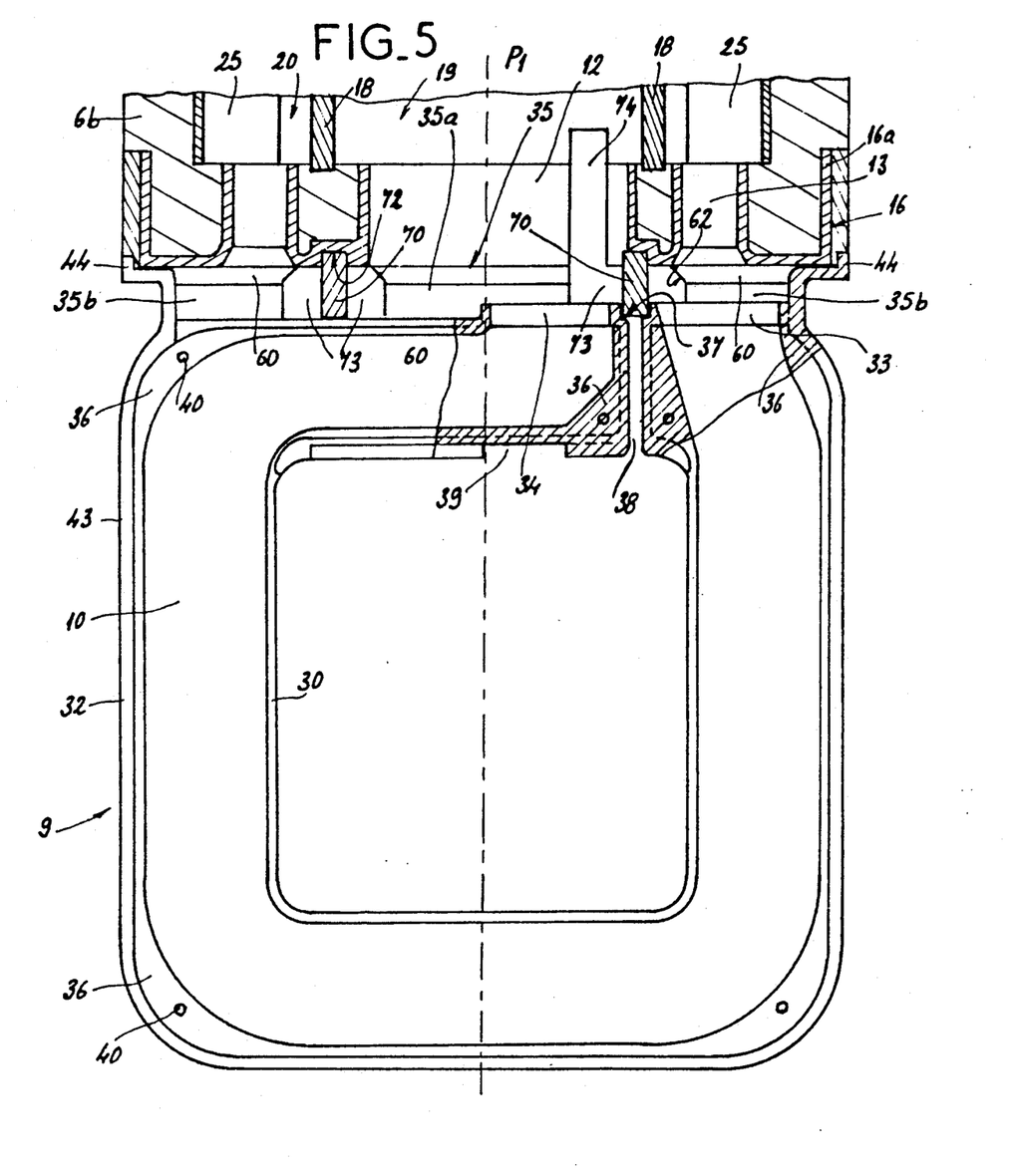
FIG. 5 is a side view in partial cross-section according to V—V of FIG. 3 showing, in greater detail, the structure of a spacer.

In the embodiment represented in FIGS. 1, 5 and 6, the screen support 6 exhibits, in transverse cross-section, the form of a U the wings 6b of which are turned opposite to the axial core 4 and delimit between them a cavity which is obturated at the upper part by a joining piece of insulating material 17 (FIG. 1), and at the ends by the walls 63 of the shields 15A. This cavity is divided internally by two longitudinal partitions 18 into three compartments, namely a central inlet compartment 19 and two lateral outlet compartments 20. The compartment 19 communicates by openings 22, which can be seen in particular in FIGS. 2 and 4, with a source of cooling fluid under pressure and, for example, a forced source of air. The lateral outlet compartments 20 communicate with the exterior either by openings formed directly in the joining piece 17 or by openings 23 formed in the wings 6b of the screen support 6 and communicating with escape nozzles 24 (FIG. 1).

FIG. 1 shows that each lateral compartment 20 also serves to receive cooling fins 25 projecting from combs fixed on the internal face of the wings 6b of the screen support 6. These fins are disposed in the outlet path of the cooling fluid escaping through the openings 13 of the web.

FIG. 1 also shows that the central openings 12 and the lateral openings 13 of the web 6 are covered by wells 12a and 13a projecting from the insulating cover 16, which cover is equipped with a skirt 16a enclosing the web as shown in FIG. 1.

FIG. 6 shows that this skirt 16a locally comprises depressions 26 and 27 covering depressions 26a and 27a respectively formed in the screen support 6.

Each one of the spacers 9a-9b forming with two magnetic islets 8 a ventilated hollow tooth is constituted by a piece made of molded synthetic material and exhibits, as shown in FIGS. 5 and 6, an interior wall 30 and an exterior wall 32 delimiting between them a channel 10 having the shape of a closed C. This channel opens, on the outside, through mouths, an exterior one 33 and an interior one 34 respectively. As shown in FIG. 5, the mouths 34 and 33 are offset in relation to the median plane P1 of the spacer in order that the same spacer should be able alternately to be disposed with its mouths on one side or on the other side of the plane P1. This figure also shows that the mouths open below the web 6a of the support screen 6 in a chamber referred to as the intermediate chamber and generally designated by 35.

The interior and exterior walls 30 and 32 of each spacer 9a-9b are equipped, on their opposite faces delimiting the channel 10 and in the zones of change of direction thereof, with protuberances 36 channeling the fluid and preventing the formation of turbulent currents in the corners. The two mouths 33 and 34 are separated by a groove 37 which is extended by a slit 38 passing through the interior wall 30. The latter serves for the passage of the link conductor between the two coil disks of a double coil disk, in the course of the assembly of a spacer between these two coil disks. Moreover, and as is shown in greater detail in FIG. 5, the interior wall 30 is equipped, on one of its sides, with an oblique transverse groove 39 serving to receive the link conductor between the two coil disks, when the spacer 9a-9b is in its final position between the two coil disks. Finally, at least in the spacers 9a, the protuberances 36 are equipped locally with longitudinal studs 40 capable of cooperating with piercings 42 formed, as shown in FIG. 6, in each one of the metal sheets 8 constituting the magnetic islets, in order to ensure the positioning of these islets in relation to the spacer.

Figure 3:
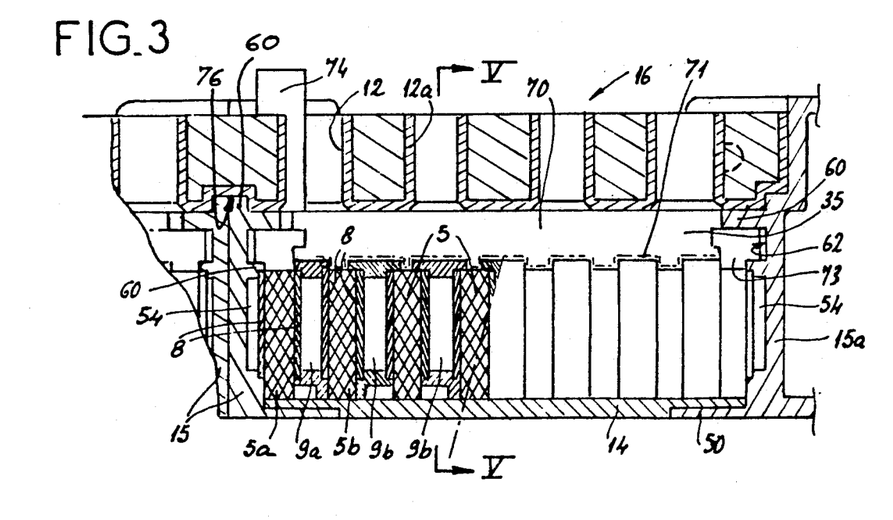
FIG. 3 is a partial view showing, on an enlarged scale, the various components associated with a coil for forming an intermediate distribution chamber.

The spacer 9a described hereinabove is intended to be disposed at the ends of the coil, in the shields 15a or 15. It is associated with spacers 9b, of the same form and structure as itself but further comprising a peripheral rib 43 strengthening its exterior wall and imparting to it, as shown in FIGS. 6 and 3, a T-shaped transverse cross-section. Such a rib improves the positioning of the metal sheets 8, but also permits the positioning of the coil disks in relation to the spacer. This rib is extended above the openings 33 and 34 to strengthen the cap 44 used to position the spacer 9a-9b in relation to the insulating cover 16.

As shown in FIG. 6, each one of the laminated metal sheets 8 forms, in side view, a square ring, one of the sides of which is split at 45. This slit is utilized for the passage of the link conductor of two coil disks in the course of the introduction of the metal sheet 8 into the gap between the two coil disks of a double coil disk.

Each one of the shields 15 or 15a comprises (FIG. 6) projecting from its face opposite to the coil with which it cooperates, on the one hand, a mandrel 50 of square cross-section capable of being traversed by the magnetic core 4 and of receiving, by press fitting, the end of the sleeve 14, and, on the other hand and around this mandrel, two ribs, an interior one 52 and an exterior one 53 respectively, delimiting between them a C-shaped channel 54 similar to that delimited in the spacers and, finally, abutments 55 for the positioning of the corresponding magnetic islet 8. The channel 54, delimited between the diametral wall of the corresponding shield and the laminated metal sheet 8, communicates through openings 56 and 57 with the intermediate chamber 35 previously described, that is to say with the gap formed between the vertex of the coil and the insulated web of the screen support 6. The diametral wall of the shield is likewise integral with a skirt 58 capable of surrounding the coil on three sides and extending beyond the upper face of this coil to form a fixing cap 59. The two wings of this cap are connected by a crossmember 60 which locally comprises mortises 62, the usefulness of which will be expounded hereinbelow.

Figure 2:
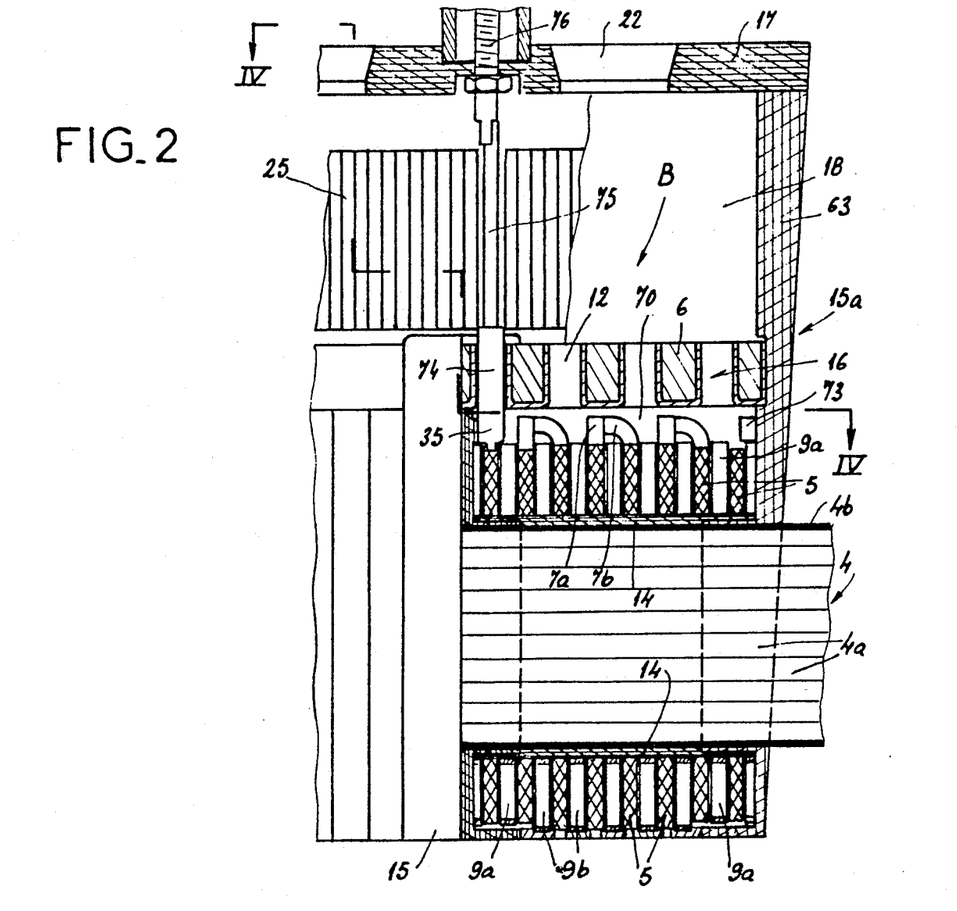
FIG. 2 is a partial view in longitudinal cross-section according to II—II of FIG. 1 of one of the coils with its fixing means.

As shown in FIG. 6, each end shield 15a comprises, in addition to the previously described components, a transverse wall 63 extending beyond the cap 59 and constituting means for the obturation of the ends of the screen support 6, as shown in FIG. 2. This wall comprises grooves 64 for the positioning of the partitions 18.

The spacers 9a-9b, the sleeve 14, the shields 15 and 15a and the insulating cover 16 are made by injection molding from one and the same synthetic material, chosen for its electrical insulation properties and its thermal stability, but also for its dimensional stability and for example, in a phenylene-polysulfide-based compound, from glass fibers and from mineral fillers. By virtue of their mode of implementation, the various components of the cooling device have stable dimensional characteristics facilitating their mounting and assembly with press fits.

FIG. 3 further shows, in the assembled condition, a coil composed of a succession of pieces of synthetic material which are intercalated between coil disks and metal sheets 8 forming magnetic islets, i.e., proceeding from left to right, a shield 15, a metal sheet 8, a coil disk 5a, a spacer 9a, positioning two metal sheets 8, another coil disk 5b, a spacer 9b positioning two metal sheets 8 and so on as far as the other shield 15a. Each spacer is positioned on the sleeve 14 and, by its cap 44, on the insulating cover 16, and each shield is fixed by its caps 59 on the depression 26 or 27 of the insulating cover 16 to form a rigid structure.

From the aforegoing explanation, it emerges that the assembly of the various components is undertaken very easily and very simply, without there being any need to have recourse to other linkage means except those which are required for fixing the shields on the screen support 6.

When the various components which constitute a coil are assembled, but before the screen support 6 has been placed in position, the assembly thus obtained is covered by a layer 71 (FIG. 3) of synthetic resin ensuring, inter alia, the sealing of the assembly, that is to say eliminating all air leakages in the planes of joints between metal sheets, spacers and coils. Following this, the positioning of two longitudinal stay bars 70 between said coil and the insulating cover 16 is undertaken. As shown in FIG. 4, each one of the stay bars 70 is allocated to one of the two series of spacers, i.e. to the series comprising all the mouths disposed on one and the same side of the median plane of the inductor. This stay bar is positioned by its base in the grooves 37 formed between the mouths 33 and 34 of each spacer 9a-9b, but also by engagement of its vertex into a longitudinal groove 72 formed in the web of the insulating cover 16.

As shown in FIGS. 3 to 6, at each of its ends each stay bar is equipped with lateral protuberances 73 forming tenons capable of engaging into the mortises 62 formed in the shields 15 and 15a. Furthermore, each stay bar is equipped at one of its ends with a tubular barrel 74 projecting upwards and perpendicularly to its longitudinal direction. This barrel is intended to serve for the guiding and for the passage of the conductor 75 connecting one of the terminals of the coil to a connecting plug 76 passing through the joining piece 17 as shown in FIG. 2.

It is evident that the stay bars 70 are placed in position after the terminals 7a and 7b of each one of the double coil disks have been connected to the corresponding ends of the other double coil disks.

FIG. 3 shows that the insulating cover 16 is equipped with transverse grooves 76 for the positioning of the crossmembers 60 of the shields 15. This press fit also constitutes means for end obturation of the intermediate chamber 35 associated with the coil disposed between the two shields.

Under these conditions, and as shown in FIG. 5, the two stay bars 70 form two longitudinal partitions dividing the intermediate chamber 35 into three compartments, namely a central compartment 35a and two lateral compartments 35b. The central compartment 35a places the central chamber 19 of the screen support 6 in communication with the inlet mouths 34 of the spacers, but also with the openings 56 of the channels 54 of the shields. The lateral compartments 35b ensure the communication of the lateral mouths 33 of the spacers and the lateral openings 57 of the shields with the lateral chambers 20 of the insulating support 6 and thus permit the air flow, which has just cooled each one of the hollow magnetic teeth, to penetrate into the insulating support to pass along the fins 25 before escaping through a collector, either directly to the exterior or through a heat exchanger.

The stay bars 70 which are made of the same synthetic material as that constituting the spacers, the shields and the insulating cover 16, thus provide a function of distribution of the air flow, until then achieved by extensions of the walls 18 which are far more complex to implement, and on a complementary basis provide a function of guiding of the supply conductor of the coil. In this connection, FIG. 1 shows that each one of the barrels 74 is disposed in such a manner as to pass through one of the openings 12 of the web 6a of the screen support 6 without forming a significant protuberance which might disturb the circulation of the cooling fluid.

It emerges from the aforegoing that the cooling device according to the invention is distinguished from those described in the prior art by the structure of the screen support of the inductor and by the structure of the means organizing the network for the distribution and for the collection of the cooling flow, the latter means being arranged to be of easy assembly, to reduce the thicknesses and space requirements, to improve the heat exchanges at equal air flow rate, and to result in an improvement of the power factor and of the output of the motor.

I claim:

1. A cooling device for a linear motor inductor having a prismatic axial core with a plurality of coils surrounding said prismatic axial core, each coil comprising two coil disks and each coil disk having a first face and a second face of a substantially square configuration defining four surface edges for the coil, the cooling device comprising:

a U-shaped support constituting a magnetic screen offset from the plurality of coils, a cross-member of said U-shaped support defining a web from which two wings extend in a direction away from the plurality of coils, said web having a plurality of openings therein;

a joining piece mounted on said wings to define a cavity equipped with inlet and outlet openings for flow of a cooling fluid, said cavity being divided by at least one partition into a central inlet chamber and at least one lateral outlet chamber;

components forming radiators mounted on a surface of said wing facing into said at least one lateral outlet chamber;

magnetic islets associated with each face of each coil disk;

a spacer positioned between said magnetic islet associated with the first face of one coil disk and said magnetic islet associated with the second face of an adjacent coil disk, said spacer between said magnetic islets forming an annular cooling channel, said spacers being made of a molded synthetic material and further comprising an interior wall and an exterior wall that together with said associated magnetic islets form said annular cooling channel with a C-shape; a mouth formed in said exterior wall at each end of said C-shaped annular cooling channel for communicating with said openings in said web; and a groove between said mouths at each end of said C-shaped annular cooling channel;

at least one longitudinal bar of a synthetic material having a base received in said groove between said mouths of said spacer;

an insulating cover covering said web of said U-shaped support on a side toward the axial core, said insulating cover on a side adjacent said web having wells extending into said openings and on a side toward the axial core having at least one groove for receiving a vertex of said longitudinal bar;

shield means of a synthetic material at each end of each coil;

an intermediate chamber formed between said insulating cover and said plurality of coils, wherein said longitudinal bar is equipped with positioning means at each end and said shield means have complementary means for receiving said positioning means, said longitudinal bar forming a partition in said intermediate chamber.

2. The device as claimed in claim 1, wherein the wings of the U-shaped support and two said partitions which are parallel to said wings and interposed between the web of the U-shaped support and said joining piece form the central inlet chamber and two lateral outlet chambers for the cooling fluid, said radiator components associated with the surface of said wings of said U-shaped support facing into said lateral outlet chambers are fins fixed to the surface of each wing, and wherein the mouths of each spacer are offset laterally in relation to a median plane in order to ensure communication with the central inlet chamber and one of the lateral outlet chambers irrespective of the position of the spacer upon assembly of the coil.

3. The device as claimed in claim 1, wherein said interior and exterior walls of each spacer have projecting from their faces delimiting said annular cooling channel, and in a zone of direction change of said annular cooling channel, protuberances for channeling the fluid and opposing formation of localized turbulent flows.

4. The device as claimed in claim 3, wherein the exterior wall of the spacer is integral with an exterior rib imparting to it a T-shaped transverse cross-section and delimiting positioning seatings for the magnetic islets and the coil disks.

5. The device as claimed in claim 1, wherein said interior and exterior walls of each spacer are equipped with positioning studs extending in a longitudinal direction parallel to the axial core, which are capable of cooperating with a plurality of piercings formed in each said magnetic islet.

6. The device as claimed in claim 1, wherein, within each spacer, the groove for the positioning of the longitudinal bar is extended, in the direction of a center opening of said spacer, by a slit passing through said interior wall, said slit serving for the passage of a link conductor for the two coil disks of a double coil disk, wherein on a side of said interior wall of said spacer facing the axial core and offset from said slit is an oblique groove comprising a seat for said link conductor.

7. The device as claimed in claim 1, wherein one of the ends of the longitudinal bar is equipped with a tubular barrel perpendicular to the longitudinal bar and capable of penetrating into one of the openings into said central chamber of said web of the U-shaped support through one of said wells of the insulating cover and constituting a conduit for a conductor of a terminal of one of the coils.

8. The device as claimed in claim 1, wherein said positioning means with which each said longitudinal bar is equipped comprises lateral projections forming tenons which are each capable of engaging into one of said complementary means comprising mortises formed in each shield means.

9. The device as claimed in claim 1, wherein each shield means comprises a mandrel to receive a sleeve surrounding the axial core, said mandrel projecting from a face opposite to one of said magnetic islets, and around this mandrel an interior rib and an exterior rib delimiting a C-shaped annular cooling channel similar to that of said spacers and having a central opening and a lateral opening which open directly into the intermediate chamber; abutments for positioning one of said magnetic islets; and a skirt surrounding the coil on three of its edge surfaces and extending beyond a fourth edge surface of the coil, to form a fixing cap for attachment to said U-shaped support and said insulating cover.

10. The device as claimed in claim 9, wherein the U-shaped support and the insulating cover form an assembly common to a plurality of coils and a coil of said plurality of coils at each end of the axial core has an end shield at an outer side and an intermediate shield at an inner side and at least one coil of the plurality of coils between the end coils have said intermediate shields delimiting each side, said end shields and said intermediate shields comprising said shield means, said assembly cooperating with said intermediate shields and with said end shields to define said intermediate chamber, each said end shield being extended beyond their fixing cap by a wall for the obturation of an end of said U-shaped support, said assembly further comprising means for receiving said fixing caps of said end and intermediate shields and said insulating cover is equipped with transverse grooves for positioning a crossmember comprising a skirt of said intermediate shields over said fourth face of the coil, said grooves constituting, with said crossmembers, means for end obturation of said intermediate chamber associated with each at least one coil of the plurality of coils.

* * * * *